United States Patent [19]

Dombroski et al.

[11] 4,368,803

[45] Jan. 18, 1983

[54] APPARATUS FOR DISPENSING FLUID ONTO A MOVING MECHANICAL SYSTEM

[75] Inventors: Robert M. Dombroski, McFarland; Jerry C. Sitzman, Madison, both of Wis.

[73] Assignee: Madison-Kipp Corporation, Madison, Wis.

[21] Appl. No.: 176,110

[22] Filed: Aug. 7, 1980

[51] Int. Cl.³ ............................................. F16N 29/00
[52] U.S. Cl. .................................. 184/15 B; 198/500
[58] Field of Search ................. 184/15 B, 15 A, 15 R; 134/122; 198/500, 495

[56] References Cited

U.S. PATENT DOCUMENTS

| | | | |
|---|---|---|---|
| 3,067,837 | 12/1962 | Burrows | 184/15 B |
| 3,116,810 | 1/1964 | Olson | 184/15 B |
| 3,450,227 | 6/1969 | Montgomery | 184/15 A X |
| 3,785,456 | 1/1974 | McIntire et al. | 184/15 B X |
| 4,085,821 | 4/1978 | Kast et al. | 184/15 A |

Primary Examiner—David H. Brown
Attorney, Agent, or Firm—Merriam, Marshall & Bicknell

[57] ABSTRACT

Apparatus for dispensing fluid such as lubricating oil onto selected points of a moveable mechanical system, such as a chain conveyor, independent of the speed of movement of the mechanical system, the apparatus including an actuable fluid dispenser mounted for delivering fluid to the mechanical system in response to an actuating signal, a detector positioned adjacent the moveable mechanical system with means for generating an actuating signal and being responsive to the movement of a designated portion of the mechanical system past the detector, means for measuring the respective time interval between movement of two successive portions of the mechanical system past the detector, and means responsive to the measured respective time interval for proportionally delaying application of the actuating signals to the fluid dispenser so as to compensate for any variations in the speed of the mechanical system.

22 Claims, 2 Drawing Figures

APPARATUS FOR DISPENSING FLUID ONTO A MOVING MECHANICAL SYSTEM

This invention relates to automatic control systems for accurately dispensing fluids onto a moving apparatus, more particularly to such devices which can lubricate a conveyor chain or other moving machinery, such as rotating machinery, etc., while the chain or machinery is in operation.

BACKGROUND OF THE INVENTION

Reference may be made of the following U.S. Patents of interest: U.S. Pat. Nos. 3,869,023; and 4,024,930.

Various devices are presently in use for applying a lubricating fluid to a particular part of a conveyor as the conveyor travels past the lubricating station in the course of normal operation. Generally, such automated lubrication systems include an air valve trip device periodically tripped by a portion of the conveyor system so as to actuate suitable apparatus for delivering lubricating fluid to the conveyor portion requiring lubrication. Thus, a lubrication sequence is initiated each time the particular conveyor portion is detected. In the installation of such prior art lubricating systems, the placement of the conveyor event detector and the lubricator output are set by the installer in accordance with a particular conveyor operational speed. In accordance with the particular conveyor speed, the installer takes into account the delay inherent in the lubrication apparatus between sensing the conveyor event and furnishing lubricant to the conveyor, and accordingly places the lubricating nozzle at the appropriate point downstream from the event detector.

In most applications of automated lubrication systems, lubrication sequences are not performed continuously. Instead, a timer device is often used to initiate a lubrication cycle, i.e., a number of lubrication sequences sufficient to service all lubrication points of the machine. In variable speed systems, where the amount of machine operation may vary widely in the interval established by the timer, timer use may result in either over-lubrication, with consequent waste of lubricant, or under-lubrication of the machine.

It is now desired to provide a more flexible automatic lubrication system for conveyors which will avoid both over-lubricating and under-lubricating a particular conveyor portion. In addition, it is desired to provide a conveyor lubrication system which will automatically compensate for varying conveyor speeds and which may be used to lubricate either constant speed conveyors, low or high speed conveyors, or variable speed conveyors. Furthermore, it is desired to enable the installer to install a lubricating system more readily by providing him with flexibility in locating the conveyor event detector and the lubrication delivery nozzle.

SUMMARY OF THE INVENTION

In accordance with the principles of the present invention, there is provided an automatic lubrication system for conveyors wherein:

(1) The interval between lubrication cycles is based on the amount of conveyor travel rather than on an elapsed time. In particular, means are provided for sensing the passage of a particular conveyor chain portion as well as for accumulating the number of such events and determining the completion of a conveyor pass. Means are also provided to accumulate the number of conveyor passes and to allow the operator to select the number of conveyor passes which shall occur before a lubrication cycle is initiated.

(2) A lubrication delay compensation means is provided to deliver lubricant in response to detected chain events at any selected point along a chain segment, independent of the speed of chain. In particular, means are provided for measuring the time interval between detected chain events and generating a time delay which is proportional to the interval measured between the last two detected chain events. Means are also provided for the operator to independently select the desired proportion of the total time interval and to select a fixed time interval to be subtracted from the proportional amount. The proportional component of the delay enables the lubricator nozzles to be set anywhere along the conveyor with respect to the position of a conveyor event detector, while the fixed (negative) component of the delay compensates for a fixed delay of the lubricant pumping system. The net delay generated is therefore appropriate to the delivery of lubricant after a fixed amount of chain travel, independent of chain speed or fixed delays associated with the pumping system.

(3) The lubrication cycle may be performed over multiple passes of the conveyor chain. Means are provided to select a number, K, of passes over which the lubrication cycle occurs such that a lubrication sequence occurs at every Kth detected chain event during a given pass of the conveyor. Means are also provided to adjust the starting point of the first lubrication sequence at the start of each conveyor pass such that all lubrication points of the conveyor receive lubricant during the K passes of the lubrication cycle. This provision permits the use of lubricant pumping apparatus with cycle times greater than the miniumum interval between detected chain events or with pumping capacity otherwise insufficient to lubricate each conveyor lubrication point sequentially in one pass.

(4) Two pump solenoids may be operated sequentially in multiple pass lubrication sequences. Means are provided to actuate two separate pump solenoids such that the lubrication cycle described in (3) above is performed with each pump solenoid, but the lubrication sequence performed by actation of the second solenoid is delayed from that performed by actuation of the first solenoid by one detected chain event. Acutation of the two solenoids is simultaneous when a lubrication sequence is performed in a single pass. This provision minimizes the peak consumption of input resources such as electrical power, compressed air, and lubricant from a common reservoir.

(5) The duration of solenoid actuation and resultant release of lubricant may be controlled. Means are provided to set the time duration of solenoid actuations. This provision enables the operator to maximize the pump speed by adjusting the solenoid "on" time to the minimum value to reliably deliver lubricant to the wear point.

(6) The maximum rate at which chain events may be detected can be limited. Means are provided for setting a time interval, initiated by a chain event detector output, during which response to subsequent detector outputs is inhibited. This provision prevents the controller from responding to spurious detector signals resulting from vibrations of the chain or detector mount. The time interval selected would be less than the minimum interval expected between successive chain events, but of sufficient duration to ensure that the detected chain portion has traveled beyond the range of vibration effects.

DETAILED DESCRIPTION

Figure 1:
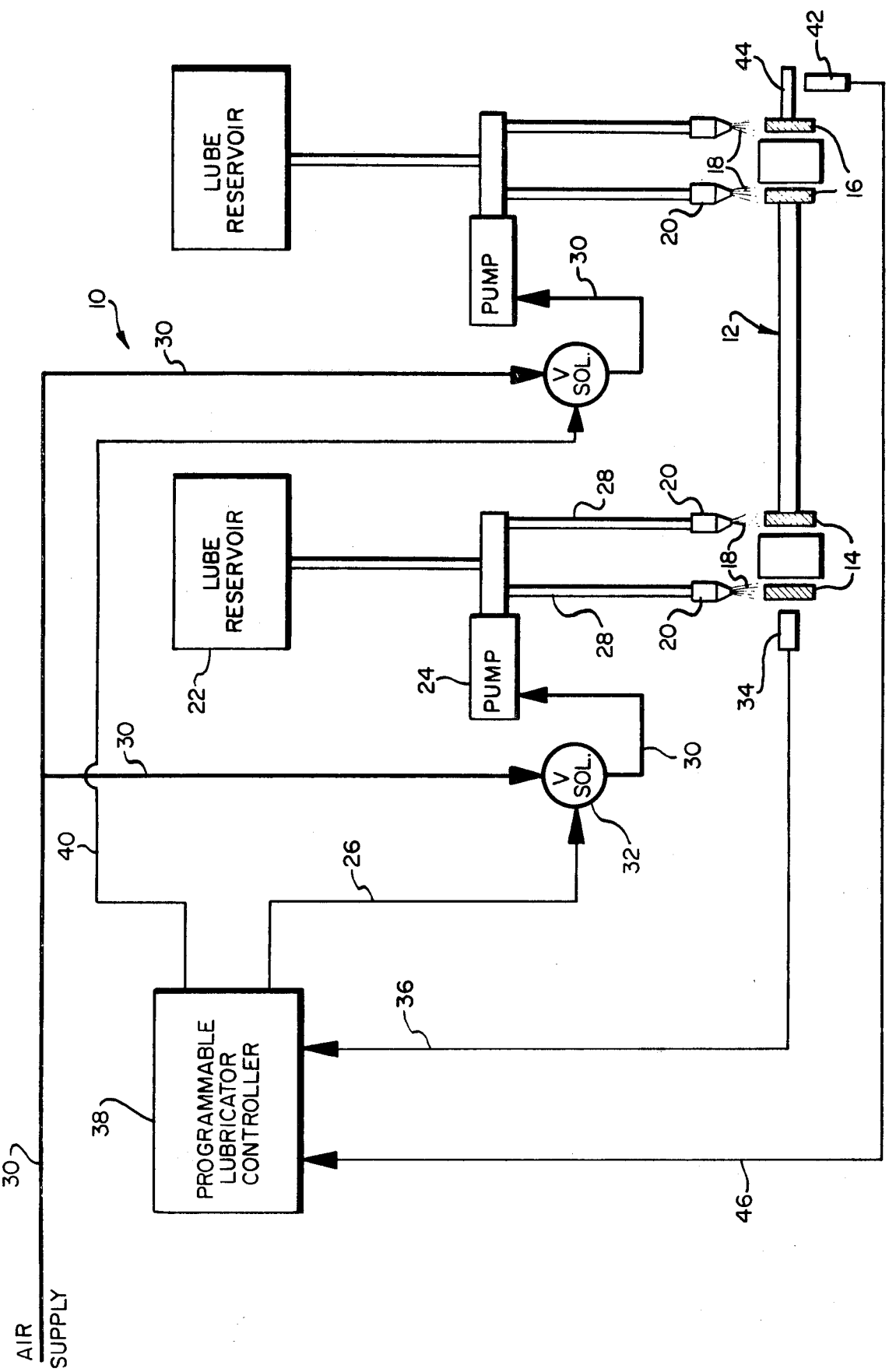
FIG. 1 is an overall schematic diagram illustrating the programmable lubricator controller of the present invention along with typical apparatus suitable for lubricating a conveyor chain.

Referring now to FIG. 1, there is illustrated an automatic lubricating apparatus 10 useful in lubricating, for example, a movable conveyor chain 12 or the like. The chain 12 includes, for instance, double-sided links 14 and 16, each of which are subjected to a shot of lubricating fluid 18 from respective nozzles 20 mounted adjacent the links. The lubricant is contained within one or more reservoirs 22 for supply to a respective pump 24 which delivers the lubricant through respective lubricant lines 28. The indicated heavier lines 30 on FIG. 1 denote air supply lines coupled to an electromagnetically actuable solenoid 32 for actuating pump 24 and thereby delivering the shots of lubricant 18 to the respective links 14, 16.

A link event detector 34 suitably mounted adjacent links 14 detects the passage of successive links past the event detector to provide trigger pulses on line 36 through a programmable lubricator control unit 38. It is to be understood herein that the term "programmable" is meant to signify the entry of several predetermined factors as well as characteristics of the lubricating unit and the chain conveyor to provide a flexible unit useful with variable speed conveyors as will be described herein.

The controller 38 in response to trigger signals on line 36 supplies the lubricator actuation signals on lines 26, 40 for suitable delivery of lubricating shots 18 to links 14 and 16. As an alternative, the lubricator apparatus 10 may also include another event detector 42 for detecting a member 44 protruding, for instance, from link 16. Only one member 44 is provided on the conveyor chain 12 so that when event detector 42 has sensed two successive passages of member 44 the conveyor chain 12 has completed one pass, or, in other words, has gone through once-around. Thus, in some instances herein, the event detector 34 is termed the "link detector", and detector 42 is termed the "once-around detector". The output from the event detector 42 is connected on line 46 to the controller 38.

While the principles of the invention have been illustrated and described herein in connection with dispensing of lubricant to a conveyor chain, the invention can be applied to movable mechanical systems in other environments. Those skilled in the art may readily apply the principles herein, for example to the dispensing of adhesive, food products, and other liquids in moving apparatus. Accordingly, this description is for the purpose of setting forth a preferred embodiment of the invention and is not to be understood to limit the invention to lubricant dispensing.

Figure 2:
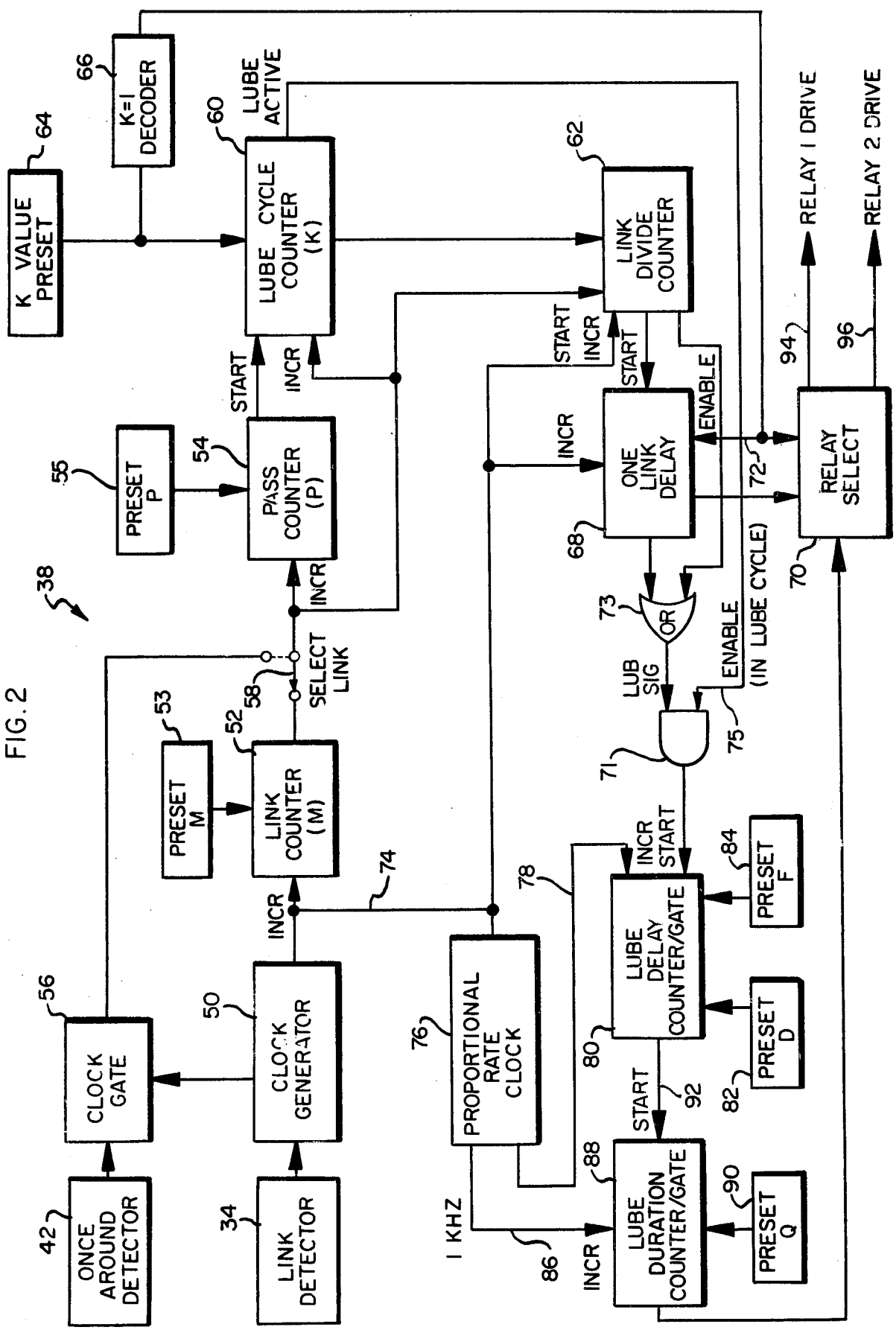
FIG. 2 is a block diagram illustrating the apparatus of the present invention and its interconnection.

Referring now to FIG. 2, there is illustrated a programmable lubricator controller 38 in accordance with the principles of the present invention. In particular, the controller 38 includes means for setting up a reliable lubrication program for a conveyor wherein, for instance, the links 44 and 16 may be lubricated once each conveyor pass, or in alternate passes, or the lubrication cycle can be changed as desired. Controller 38 controls the interval between lubrication cycles based on the amount of travel of conveyor chain 12 rather than on the elapsed time. The interval is measured by the link detector to count the number of chain conveyor links passing the detector and comparing this count to preprogrammed values. While the present description will be in terms of links, it is understood that the detector 34 can as well count the number of other lubrication "events" or "opportunities" passing the detector, which detected items may be in actually pins of a chain, wheels of an overhead conveyor, or any point of a conveying system which has an unique relationship to the points of lubrication.

A clock generator 50 is triggered by the link detector 34 upon passage of link 14 and generates a sequence of clock pulses to increment the state of the logic elements contrained in the controller. Thus, a respective sequence of clock pulses from clock generator 50 corresponds to the respective time interval between movement of successive links 14 past the link detector 34. Well-known detector debounce means are provided to prevent more than one sequence of clock pulses from the generator from occuring, should multiple link detector closures occur when sensing a single link. Detectors 34 and 42 are conventional elements, such as proximity switches, commercially available for sensing the passage of a moving member and providing an output signal.

A link counter 52 responds to the output of clock generator 50 to provide a count of the number of links which have passed the link detector 34. A pass counter 54 is incremented by the link counter output to provide a Start output upon completion of the Repeat Period where the Repeat Period is the programmed number of conveyor passes required to initiate a lubrication cycle. In other words, pass counter 54 provides a Start signal each time the conveyor 12 has gone once-around.

Pass counter 54 may also be incremented by the clock gate 56 which produces an output pulse after each closure of the once-around detector 42. Incrementing the pass counter from the clock gate 56 rather than from the link countr 52 is provided by placing switch 58 in the appropriate position. This option is provided in the event the number of links in the chain conveyor system are numerous and it would be thus burdensome to determine when the conveyor has gone once-around. In addition, if the conveyor 12 has been modified to change the number of links, the use of the once-around detector eliminates the need to reprogram the link counter 52.

A lube cycle counter 60 is started by an output from the pass counter 54 on each once-around of the conveyor chain 12 and is incremented upon completion of each successive pass of the conveyor. In the case of low speed conveyors, it is possible to lubricate each point once during a single conveyor cycle. If such an operation is not possible due to the speed of the conveyor or the response time of the lubrication system, it may be desired to lubricate only every other link or every fourth link. if lubrication of every fourth link is desired, then the lube cycle counter 60 can be programmed by presetting so that every fourth link is lubricated in any one pass of the conveyor and the complete lubrication cycle in which every link has been lubricated is completed in four passes of the conveyor.

Link divide counter 62 is started on each once-around of the chain and is incremented from clock generator 50 so as to count the number of link detector closures. Link divide counter 62 provides an output every K links. At the start of each conveyor passage, link divide counter 62 is initialized to a new value taken from the lube cycle counter 60. This operation results in the lubrication of a different set of links in each conveyor passage, so that all links are lubricated after K passages of the conveyor.

If it is desired that each of the links 14, 16 is to be lubricated once each pass of the conveyor 12, a K value of unity is set into the programmable switches 64 so as to be inserted into the lube cycle counter 60. A decoder 66 responds to the setting of K=1 to provide a single, static output to disable a one-link delay unit 68. When this condition is present, the relay select unit 70 will activate both of the respective relays connected to the solenoids 32 so as to provide simultaneous dispensing of lubricant to the links 14 and 16. When K is not equal to 1, the one-link delay unit 68 generates an output pulse for each closing of link detector 34 following an output from the link divide counter 62. In addition, a control signal is supplied on line 72 to the relay select unit 70 to alternately enable the relay drive outputs 94 and 96. These relay drive outputs control operation of the solenoids 32 and thereby alternately dispense lubricant to links 14 and 16.

As each link 14 passes the link detector 34, the sequence of clock pulses from clock generator 50 is also coupled on line 74 to a proportional rate clock unit 76. Clock 76 responds to successive sequences of clock pulses from the generator 50 which correspond to the time intervals between link detector closures to divide each of the detected intervals into 1,000 equal parts. Thus, clock 76 provides a signal on line 78 having a repetition period which is proportional to the detected time interval between successive link detector closures such that the time interval is divided into 1,000 equal parts. Thus, for example, if the detected time interval between successive detector actuation is 1 second, the signal repetition period on line 78 would be 1 millisecond; whereas if the time interval extends to 2 seconds, the signal repetition period on line 78 will increase to 2 milliseconds. This provides a proportional indication of the relative increase or decrease in the speed of the conveyor.

This proportional conveyor rate information is coupled on line 78 to a lube delay counter/gate 80. Lube delay unit 80 also includes suitable registers into which may be entered two delay values representing the system characteristics. In particular, data entry switches 82 are set to enter into the associated register in lube delay unit 80, a value, 1 to 999, to adjust the interval required between a link detector switch closure and the occurrence of the lubricant output at a link. This parameter, which may be termed Lube Delay (D) is a function only of the chain pitch (i.e., the distance between successive links) and the spacing between the lubricant nozzles 20 and the link detector 34. Another set of data entry switches 84 is provided to enter into the register in lube delay unit 80 a delay factor termed, Fixed Delay (F), to correct for the error introduced in the position of the lubricant output because of the time delay, assumed to be fixed, between the activation of the relay drive outputs of relay select unit 70 and the actual output of lubricant from nozzles 20.

Thus, the lube delay unit 80 incorporates fixed delay values from data entry units 82 and 84 along with a proportional delay value on lin 78 which corresponds to the speed of the conveyor chain 12, thus producing a net delay in the delivery of lubricant which corresponds to a constant amount of chain travel, independent of the speed of the chain. This allows the lubricant nozzles 20 to be set anywhere along the conveyor chain 12 with respect to the link detector with the proper amount of delay so that when link switch 34 is activated the nozzle 20 will accurately deliver lubricant to a particular link 14 or 16, and also enables the system to automatically compensate for any variations in chain conveyor speed.

A one $KH_z$ signal is conveniently provided from the clock 76 on output line 86 and is coupled to a lube duration counter/gate 88 so that the pump "on" time can be properly set. In order to maximize the number of pump operations in an interval, it is necessary to set the pump "on" time to the minimum interval which will provide for reliable operation. This interval is termed the "Lube Duration (Q)," and can be pre-set to conform to the demands of the system. Accordingly, there is provided data entry 90 through which can be entered any value from 10 milliseconds to 990 millisecond in 10-millisecond increments. The lube duration unit 88 is triggered from the output line 92 of lube delay unit 80 so as to activate the relay 1 and relay 2 drives at the output lines 94 and 96 of relay select unit 70. The lube delay unit 80 is in turn activated by a lube signal output of OR gate 73 when AND gate 71 is enabled on input line 75 with the lube active output of the lube cycle counter 60, which indicates that a lubrication sequence is in progress. The lube signal is a pulse output from the clock generator 50 as gated by the link divider 62 and one link delay 68 units which are combined by OR gate 73. Data entry switches 53 are provided to enter the number of links (M) in the conveyor system into suitable registers in link counter 52. Data entry switches 55 are provided to enter the desired number of conveyor passes (P) to initiate the lubrication cycle into suitable registers in pass counter 54.

In programming the controller 38, the data entry switches 53, 55, 64, 82, 84 and 90 must be preset with the desired respective values. Each switch may consist of conventional rocker switches organized into 4-segment blocks for entry of the particular values in binary coded decimal form. The number of links (M), i.e. links 14 and 16 must be entered into link counter 52 through the switches 53. In systems where the number of links is variable, unknown or is subject to change, then the once-around detector 42 and the conveyor cycle indication member 44 must be utilized in order to provide the conveyor cycle information. Switches 55 are next preset to the number of conveyor passes to be counted before a lubrication cycle is initiated. This parameter, termed the Repeat Period (P) is thus entered into suitable registers in the pass counter 54. The next parameter, K, set into the switches 64 sets the number of conveyor chain passes over which a lubrication cycle occurs. For K equal one, a lubrication cycle is completed in one pass and every link is lubricated in turn. Both relay 1 and relay 2 drives are activated simultaneously to both links 14 and 16 on each side of the conveyor. For K greater than one, the lubrication cycle is completed in K passes, and every Kth link is lubricated in any one pass during the cycle. For example, assuming the links in a conveyor are numbered sequentially and that K is set to 3, then links 1, 4, 7, 10, etc. will be lubricated in pass 1; links 2, 5, 8, 11, etc. will be lubricated in pass 2; links 3, 6, 9, 12, etc. will be lubricated in pass 3. As previously described, if K is set to a value greater than 1, the relay 1 and relay 2 drives are not activated simultaneously since the one-link delay unit 68 is enabled on line 72, and instead relay 2 activates on the next link following relay 1 activation. Thus, if relay 1 drive is coupled to activate solenoid 32 and pump 24 to dispense lubricant to link 14, and K is set to a value greater than 1, the relay 2 drive would be activated to deliver lubricant through nozzle 20 on a link 16 downstream from the preceding lubricated link 14.

The lube delay value, (D) is set into switches 82 so as to be entered into the lube delay 80. This sets in a value of lube delay from 1 to 999, the timing weight of which is provided by the proportional signal input from line 78. The lube delay value to be set into the switches 82 is equal to (1000) B-nA/A; where A is the chain pitch or distance between succeeding links on the chain; B is the distance between the link detector and a lubricant nozzle; and n is an integer defining the number of full chain pitches separating the nozzle and the link detector. The value for the fixed delay (F) set into switches 84 correlate to the time delay, assumed to be fixed, between the activation of the relay drive outputs on lines 94, 96 and the actual output of lubricant from nozzles 20. This value in milliseconds can be calculated from the following expression: 10,000−T(1000)/D, where T is the system delay expressed in milliseconds and D is the lube delay.

For conveyor systems wherein the speed is variable, the following procedure should be used in adjusting the aforementioned pre-set values in order to enable the system to compensate for variable speeds:

(1) Estimate the system delay, T, calculate the Fixed Delay (F), using the aforementioned relationship, and program this value into the F registers. If it is not possible to estimate T, then set the program switches 84 to 9999.

(2) Operate the conveyor at the lowest practicable speed and set the switches 82 to provide lubrication at the desired point.

(3) Operate the conveyor at the maximum expected speed and note the delivery of lubricant onto the links or other wear point.

(4) If the lubricant is ejected too late, then increase the Fixed Delay value until proper delivery is achieved. If it is ejected too soon, then reduce the Fixed Delay.

(5) Repeat steps (2) through (4) until satisfactory performance is achieved over the full range of speeds.

The individual components represented in the block diagram of FIG. 2 are conventional, commercially available units or combinations thereof.

While particular embodiments of the preset invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

We claim:

1. Apparatus for dispensing fluid onto selected points of a movable mechanical system independent of the speed of movement of said mechanical system, said apparatus comprising:
    an actuable fluid dispenser source mounted for delivering fluid to said mechanical system in response to actuation of said fluid dispenser source;
    a detector positioned adjacent said movable mechanical system including means for generating dispenser source actuating signals responsive to the movement of a designated portion of said mechanical system past said detector;
    means for measuring the respective time interval between movement of two successive designated portions of said mechanical system past said detector; and
    means responsive to the measured respective time interval for proportionally delaying application of said actuating signals to said fluid dispenser source.

2. Apparatus according to claim 1, including fixed time delay means reducing said proportionally delayed application of said actuating signals to compensate for any variation in the speed of said mechanical system.

3. Apparatus for dispensing fluid onto selected points of a movable mechanical system independent of the speed of movement of said mechanical system, said apparatus comprising:
    an actuable fluid dispenser source mounted for delivering fluid to said mechanical system in response to actuation of said fluid dispenser source;
    a detector positioned adjacent said movable mechanical system responsive to the movement of a designated portion of said mechanical system past said detector;
    clock generator means for generating a sequence of clock pulses in response to each movement of said designated portion of said mechanical system past said detector;
    proportional rate clock means responsive to the sequence of clock pulses from said clock generator means corresponding to the respective time interval between movement of successive designated portions of said mechanical system past said detector to provide a sequence of respective proportional rate clock pulses dividing said time interval into a predetermined number of equal intervals; and
    delay means coupled to said actuable fluid dispenser source, including means responsive to said proportional rate clock pulses to proportionally delay the actuation of said dispenser source.

4. Apparatus according to claim 3, including fixed time delay means reducing said proportionally delayed actuation of said dispenser source to compensate for any variation in the speed of said mechanical system.

5. Apparatus according to claim 3, including means for selectively disabling actuation of said fluid dispenser source.

6. In an automatic lubricator apparatus for lubricating a movable mechanical system, including an actuable lubricant source having a lubricant nozzle mounted for delivering shots of lubricant to said mechanical system in response to actuation of said lubricant source, and a detector positioned adjacent said movable mechanical system including means for generating lubricant source actuating signals responsive to the movement of a designated portion of said mechanical system past said detector, the improvement wherein said lubricator apparatus compensates for varying speeds of said mechanical system, said improvement comprising:

means for measuring the respective time interval between movement of two successive designated portions of said mechanical system past said detector; and means responsive to the measured respective time interval for proportionally delaying application of said actuating signals to said lubricant source.

7. Apparatus according to claim 6, including fixed time delay means reducing said proportionally delayed application of said actuating signals to compensate for any variation in the speed of said mechanical system.

8. Apparatus according to claim 6, including a second detector positioned adjacent said movable mechanical system, including means detecting each complete "once-around" passage of said mechanical system past said second detector.

9. Apparatus according to claim 8, including means responsive to said second detector detection of a complete "once-around" passage for selectively disabling said lubricant source actuating signals.

10. In an automatic lubricator apparatus for lubricating a movable mechanical system, including an actuable lubricant source having a lubricant nozzle mounted for delivering shots of lubricant to said mechanical system in response to actuation of said lubricant source, and a detector positioned adjacent said movable mechanical system responsive to the movement of a designated portion of said mechanical system past said detector, the improvement wherein said lubricator apparatus compensates for varying speeds of said mechanical system, said improvement comprising:

clock generator means for generating a sequence of clock pulses in response to each movement of said designated portion of said mechanical system past said detector;

proportional rate clock means responsive to the sequence of clock pulses from said clock generator means corresponding to the respective time interval between movement of successive designated portions of said mechanical system past said detector to provide a sequence of respective proportional rate clock pulses dividing said time interval into a predetermined number of equal intervals; and delay means coupled to said actuable lubricant source, including means responsive to said proportional rate clock pulses to proportionally delay the actuation of said lubricant source.

11. Apparatus according to claim 10, including fixed time delay means reducing said proportionally delayed actuation of said lubricant source in accordance with a preset amount of time to provide a net delay in the delivery of said lubricant.

12. Apparatus according to claim 11, wherein said fixed time delay means includes means for adjusting said preset amount of time.

13. Apparatus according to claim 10, including a second detector positioned adjacent said movable mechanical system, including means for detecting each complete "once-around" passage of said mechanical system past said second detector.

14. Apparatus according to claim 13, including means responsive to said second detector detection of a complete "once-around" passage for selectively disabling actuation of said lubricant source.

15. A method of dispensing fluid onto selected points of a movable mechanical system independent of the speed of movement of said mechanical system past a detector positioned to sense the movement of a designated portion of said system and to provide actuating signals to actuate a fluid dispenser, said method comprising the steps of:

measuring the respective time interval between movement of two successive designated portions of said mechanical system past said detector; and proportionally delaying application of said actuating signals in response to said measured respective time interval.

16. The method of claim 15, including the step of reducing the proportionally delayed application of said actuation signals by a preset, fixed time interval corresponding to the inherent time delay between initiation of said actuating signals and the dispensing of fluid.

17. Apparatus for controlling a fluid dispenser to allow accurate placement of said fluid onto a moving mechanical system, said apparatus comprising:

a fluid dispenser mounted to dispense fluid onto said moving mechanical system;

an event detector responsive to the passage of unique trip points on the moving mechanical system;

control means coupled to said event detector and to said fluid dispenser to control actuation of said fluid dispenser, said control means including;

means for setting a time delay between receipt of an event detector signal and the generation of a fluid dispenser actuating signal;

means responsive to (1) the measured respective time interval corresponding to the passage of successive trip points, and (2) said time delay setting, for generating a proportional time delay interval which is proportional to said measured time interval; and means for reducing the proportional time delay interval by a selectable, fixed time interval and generating the fluid dispenser actuating signal at the termination of the resultant tme interval, thereby compensating for variation in the speed of the mechanical system with respect to relative positioning of the fluid dispenser and the event detector, and with respect to a fixed, inherent delay between the occurrence of the dispenser actuating signal and the actual dispensing of the fluid.

18. Apparatus for controlling a fluid dispenser to allow accurate placement of said fluid onto a moving mechanical system, said apparatus comprising:

a fluid dispenser mounted to dispense fluid onto said moving mechanical system;

two event detectors, the first of which is responsive to the passage of unique trip points on the moving mechanical system and the second responsive to a single characteristic on the moving system which signals completion of one pass of said system; and control means coupled to said event detectors and to said fluid dispenser to control actuation of said fluid dispenser, said control means including;

means for pre-setting the number of passes of said moving system to occur between the initiation of fluid dispensing sequences;

means to selectively accumulate the number of passes of said moving system in response to signals from said first and second event detector; and means responsive to said pre-setting and said accumulated count of system passes to initiate a fluid dispensing sequence.

19. Apparatus according to claim 18, for use with a moving mechanical system comprising a chain conveyor having interconnected chain links, and including;

means to initiate said fluid dispensing sequences at a minimum rate to dispense fluid once to each chain link, correlated with the first detector responsive to passage of said trip point, over the number of passages during which such fluid dispensing sequences are initiated.

20. Apparatus according to claim 18, including means to control the duration of each period of fluid dispensing.

21. Apparatus for controlling a fluid dispenser to allow accurate placement of said fluid onto a moving mechanical system, said apparatus comprising:

a fluid dispenser mounted to dispense fluid onto said moving mechanical system;

an event detector responsive to the passage of unique trip points on the moving mechanical system and including means determining completion of one pass of said system; and control means coupled to said event detector and to said fluid dispenser to control actuation of said fluid dispenser, said control means including;

means for pre-setting the number of passes of said moving system to occur between the initiation of fluid dispensing sequences;

means to selectively accumulate the number of passes of said moving system in response to signals from said event detector;

means responsive to said pre-setting and said accumultated count of system passes to initiate a fluid dispensing sequence; and means for initiating said fluid dispensing sequences at a minimum rate to dispense fluid once to each repetitive portion on said mechanical system, correlated with the passage of said trip points, over the number of passages during which said fluid dispensing sequences are initiated.

22. Apparatus according to claim 22, wherein said means for pre-setting the number of passes of said moving system to occur between initiation of fluid dispensing sequences is variable.

* * * * *